(12) United States Patent  
Tokuda et al.

(10) Patent No.: US 7,228,271 B2  
(45) Date of Patent: Jun. 5, 2007

(54) TELEPHONE APPARATUS

(75) Inventors: Toshimichi Tokuda, Fukuoka (JP);  
Takashi Kimura, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 921 days.

(21) Appl. No.: 10/325,959

(22) Filed: Dec. 23, 2002

(65) Prior Publication Data

US 2003/0118176 A1  Jun. 26, 2003

(30) Foreign Application Priority Data

Dec. 25, 2001  (JP) .............................. 2001-391454

(51) Int. Cl.  
*G10L 11/06*  (2006.01)
(52) U.S. Cl. ...................... 704/208; 704/214; 704/215; 381/104; 381/123; 381/57
(58) Field of Classification Search ................ 704/220, 704/208, 207, 221, 223, 209, 214, 215, 210; 381/104, 107, 123, 57, 86, 119  
See application file for complete search history.

(56) References Cited

U.S. PATENT DOCUMENTS 5,630,012 A * 5/1997 Nishiguchi et al. ......... 704/208

6,285,979 B1 * 9/2001 Ginzburg et al. ........... 704/208  
6,496,797 B1 * 12/2002 Redkov et al. ............. 704/220  
6,636,609 B1 * 10/2003 Ha et al. .................... 381/104

FOREIGN PATENT DOCUMENTS

JP  2002-82685  3/2002

OTHER PUBLICATIONS

"Alan V. Oppenheim, Alan S. Willsky, Ian T. Young, "Signals and Systems", Prentice hall, 1983, p. 449-455".

* cited by examiner

*Primary Examiner*—Vijay Chawan  
(74) *Attorney, Agent, or Firm*—McDermott Will & Emery LLP (57) ABSTRACT

The telephone apparatus of the present invention comprises a first voice band expander for generating a voiced signal frequency component by shifting the frequency of the voice signal received, a second voice band expander for generating a voiceless signal frequency component by shifting the frequency of the voice signal received, and a voice composer for composing the voice signal received, the output of the first voice band expander, and the output of the second voice band expander, which is able to output clear voices in aural communication.

50 Claims, 7 Drawing Sheets

TELEPHONE APPARATUS

FIELD OF THE INVENTION

The present invention relates to a technology for expanding the bandwidth of voice signals in telephone communication and the like.

BACKGROUND OF THE INVENTION

The barrier-free society is highly needed recently. From such viewpoint, in audio communication appliances, for the elderly people or others having difficulty in hearing, there is an increasing demand for development of technology for generating a more audible audio signal by expanding apparently the band of audio signal. Usually, the audio signal through telephone line is one of the standards in audio communication mainly by verbal expression. The audio signal by telephone is limited in the frequency band width, and its tone quality is not generally excellent as compared with the original voice. For example, even in the wire telephone line of relatively favorable tone quality, the actual audio frequency band width is limited to about 300 to 3500 Hz, witch is about half of human voice frequency range. The human vocal frequency range is generally composed of fundamental frequencies of 80 Hz to 800 Hz and higher harmonics of several degrees thereof in the Japanese male voice, and is 150 Hz to 1600 Hz and higher harmonics of several degrees thereof in the Japanese female voice. Including the higher harmonics of several degrees and further voiceless sound, the vocal range is as wide as 80 Hz to 16 kHz. It is important, in comprehension of spoken words and pleasant tone quality of spoken words particularly, for the human voice to have the frequency components including harmonics of several degrees higher than 3500 Hz and to have the frequency components including the fundamental frequencies of spoken words lower than 300 Hz. The telephone line and other transmission line of narrow frequency band dissipate not only the majority of these important high and low frequency components of voiced sound but also high frequency components of voiceless sound, so that they deteriorate the tone quality of verbal audio signal in hearing. Narrowed frequency band of audio signal impedes ease of hearing and the comprehension degree (intelligibility). As a result, narrowed frequency band of audio signal is reported to be a serious problem for the elderly people or others having difficulty in hearing (Proceeding of the 1996 Autumn Meeting of Acoustic Society of Japan, Vol.1, 2-6-5, 1996).

To solve such problems, various methods and devices for expanding the frequency band of audio signals have been attempted so far. However, although they require a tremendous quantity of operation steps and memory capacity, but the processed signals are not always satisfactory in the tone quality. For example, one of a typical conventional method is the codebook mapping method, which matches an input voice of telephone frequency band with a recorded voice of wide frequency band by using a codebook, so as to generate high quality voice. But, this method not only requires a lot of matching operation steps and a lot of memories for codebook and for recorded high quality voices, but also tends to be unstable in the matching precision depending on the line status.

Another expansion method of audio frequency is on the synthesis by analysis method, which also requires a detailed and tremendous operation steps for analysis and then for synthesis. The obtained result is not satisfactory as compared with the required cost for installation.

An exceptional method has been proposed to compensate virtually the high frequency signal by using aliasing signal and fixed filter in small operation steps. This method, however, cannot expand sufficiently the high frequency range of voiceless sound, and so it does not improve the clarity and perception of sound, and then results in a dull sound.

SUMMARY OF THE INVENTION

Telephone apparatus comprises a first voice band expander for generating a voiced signal frequency component by shifting the frequency of the voice signal received, a second voice band expander for generating a voiceless signal frequency component by shifting the voice signal received, and a voice composer for composing the voice signal received, the output of the first voice band expander, and the output of the second voice band expander.

DETAILED DESCRIPTION OF THE EXEMPLARY EMBODIMENT

The outline of the embodiment in the telephone apparatus of the present invention will be described with reference to FIGS. 1 to 7.

Figure 1:
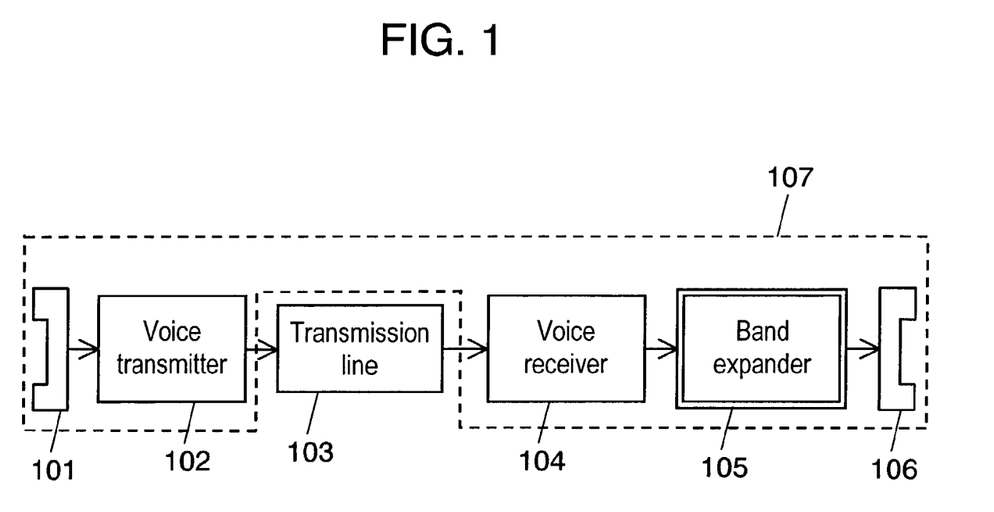
FIG. 1 is a block diagram showing the concept of the embodiment in telephone apparatus of the present invention.

In FIG. 1, a voice (broad-band voice) from the user is input into the microphone of receiver 101, and voice transmitter 102 transmits only the narrow voice band component of the voice to telephone apparatus 107 via transmission line 103 such as a telephone line. In the telephone apparatus 107 of the present invention, the narrow voice band component received by voice receiver 104 is aurally expanded by band expander 105 and is output as a psuedo broad-band voice from the speaker of receiver 106.

Next, an example of configuration of the telephone apparatus 107 will be described in detail with reference to FIG. 2.

In the telephone apparatus 107 of the present invention, same as in an ordinary telephone, arrival request signal detector 211 detects the arrival request signal arriving at the telephone apparatus from the transmission line 103 such as a telephone line, and then generates a bell sound.

After that, off-hook signal detector 212 detects the off-hook signal generated when the user picks up the receiver 106.

The user is able to set the band expanding mode (four modes are set in the present embodiment) of the received voice signal by using a mode setter 221. The information of the mode set by the mode setter 221 is stored in memory 222, and a mode detector 223 detects the mode. The operation will be described in detail later. The memory 222 is a storing means including a semiconductor memory and magnetic recorder.

The voice receiver 104 receives an analog voice signal from the transmission line 103 such as a telephone line, and signal amplifier 232 amplifies the received analog voice signal. Modem 233 demodulates the received signal according to the communication system. AD converter 261 converts the demodulated voice signal into a digital signal.

Next, the voice signal converted into digital signal by the AD converter 261 is transmitted to voice band expanding unit 201. The voice band expanding unit 201 expands the band of the voice signal converted into digital signal according to the mode. The band-expanded voice signal is converted into analog signal by DA converter 262, [and] is amplified by voice amplifier 241 and is output as a voice from voice output unit 242 such as the speaker of the receiver 106.

According to the above basic configuration, a broad-band voice of the user is input into the microphone of receiver 101, and is once processed into a narrow-band voice for transmission through the transmission line 103 such as a telephone line, and is again output as a psuedo broad-band voice from the speaker of the receiver 106.

On the other hand, the voice input from voice input unit 251 such as the microphone of the receiver 101 is amplified by voice amplifier 252 and is transmitted by the voice transmitter 102 to the transmission line 103 such as a telephone line.

Here, controller 202 executes general control of each section.

In the above description, the signal received by the voice receiver 104 is a voice signal from the transmission line 103 such as a telephone line, but it is also preferable to be communication between telephones connected to PBX installed in a building.

It is possible to apply the present invention to Internet communication by ADSL line by using modem 233 for modulation/demodulation of voice signal at the receiving side and the transmitting side.

Next, the voice band expanding unit 201 of the telephone apparatus of the present embodiment will be described with reference to FIG. 3.

The voice band expanding unit 201 comprises three voice band expanders such as first voice band expander 310, second voice band expander 320, and third voice band expander 330 for the purpose of expanding a narrow band voice to a psuedo broad band voice. The first voice band expander 310 has a voiced high-frequency shifter 311 and a voiced high-pass filter 312. The voiced high-frequency shifter 311 shifts the frequency of voice signal limited to a narrow bandwidth such as a telephonic sound. That is, the voiced high-frequency shifter 311 shifts the voice signal, passing through the transmission line 103, only by a specific frequency (about 2 kHz) to the higher frequency side so that the component of the upper limit frequency (3.5 kHz) of the voice signal, passing through the transmission line 103, becomes close to the signal band upper limit (about 5.5 kHz) of voiced sound section of the voice. Also, the voiced high-pass filter 312 filters the band of the signal shifted to the higher frequency side. The pass band of the voiced high-pass filter 312 has a bandwidth ranging from the lower limit that is the upper limit frequency (about 3.5 kHz) of the voice signal passing through the transmission line 103 to nearly the upper limit band (about 5.5 kHz) of the voiced sound, and the voiced high-pass filter 312 extracts the signal component of this band (hereinafter referred to as voiced high frequency signal component). The frequency nearly at the upper limit band of the voiced high frequency signal component is called a first frequency, and in the present embodiment, the frequency is about 5.5 kHz.

Regarding the "frequency shift" of the voice signal, the detailed description is given in the Japanese Patent Application Non-Examined Publication No. 2002-082685.

The outline of the frequency shift will be described in the following with reference to FIG. 4A to FIG. 4D.

Figure 4A:
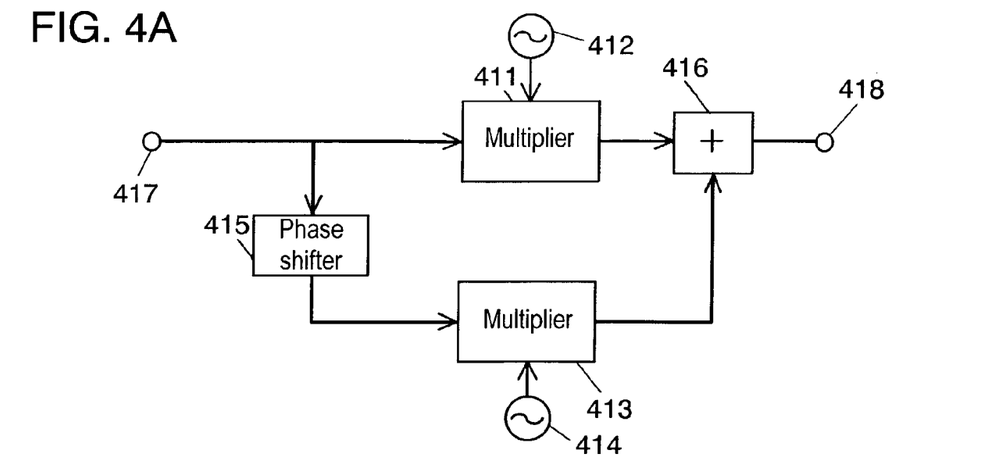
FIG. 4A is a block diagram showing the concept of a frequency shifting configuration of the embodiment in the telephone apparatus of the present invention.

FIG. 4A is a block diagram showing the concept of configuration of the frequency shift of the embodiment in the telephone apparatus of the present invention. In FIG. 4A, the voice signal applied via input terminal 417 is supposed to be sin (f×t). That is, the angular frequency is f [radian/sec], supposing a single frequency signal with t [sec] being expressive of time. The voice signal is supplied to phase shifter 415 and multiplier 411. The phase shifter 415 executes the (π/2) radian shift of the voice signal input.

Signal source 412 is a single frequency signal. The signal is supposed to be cos (F×t). It is supposed to be a cosine signal whose angular frequency is F [radian/sec]. The angular frequency F [radian/sec] is corresponding to the frequency to be shifted. The multiplier 411 multiplies the voice signal applied via the input terminal 417 and the signal from the signal source 412.

The signal source 414 is a single frequency signal. The signal is supposed to be [−sin (F×t)]. It is supposed to be a polarity-reversed sine signal whose angular frequency is F [radian/sec]. The multiplier 413 multiplies the output signal of the phase shifter 415 and the signal from the signal source 414.

Accordingly, the output signal of multiplier 411 can be represented by sin (f×t)×cos (F×t), and the output signal of multiplier 413 can be represented by −sin (f×t−π/2)×sin (F×t)=cos (f×t)×sin (F×t). Adder 416 adds the output of multiplier 411 and the output of multiplier 413, therefore the output signal 418 can be represented by sin ((f+F)×t). That is, the output signal 418 is equivalent to the input signal 417 shifted only by a frequency corresponding to angular frequency F to the higher frequency side.

Figure 4B:
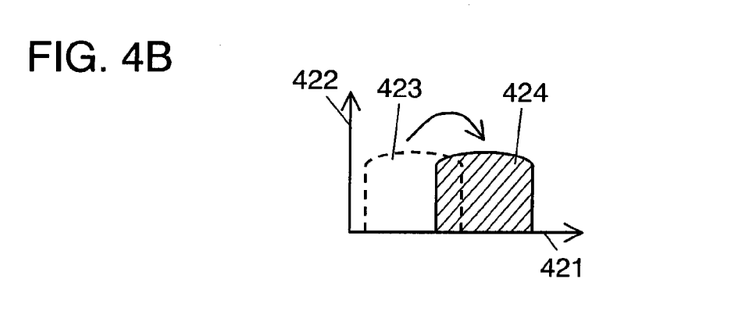
FIG. 4B shows a frequency spectrum in the block diagram shown in FIG. 4A.

FIG. 4B shows input signal 417 and output signal 418 in FIG. 4A, which are represented by frequency domaine. Horizontal axis (axis of ordinate) 421 indicates the frequency, and vertical axis (axis of abscissas) 422 indicates the amplitude. Spectrum 423 is the frequency spectrum of input signal 417, and spectrum 424 is the frequency spectrum of output signal 418. As shown in FIG. 4B, the source voice signal component is shifted to the higher frequency side only by a frequency corresponding to angular frequency F.

Figure 4C:
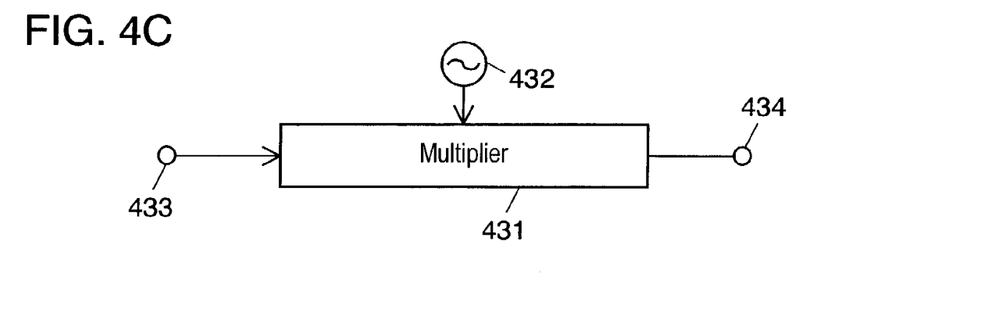
FIG. 4C is a block diagram showing the concept of a simplified frequency shifting configuration of the embodiment in the telephone apparatus of the present invention.

FIG. 4C shows a case of executing the frequency shift by a simplified method. Multiplier 431, signal source 432, and input signal 433 are respectively corresponding to the multiplier 411, signal source 412, and input signal 417 of FIG. 4A. The detailed description of these is therefore omitted.

The output signal of multiplier 431 is the result of multiplication of sin (f×t) and cos (F×t), that is, sin ((f+F)×t)+sin ((f−F)×t). It is also preferable to employ the method in FIG. 4C provided that only the component sin ((f+F)×t) of the signal can be extracted.

Figure 4D:
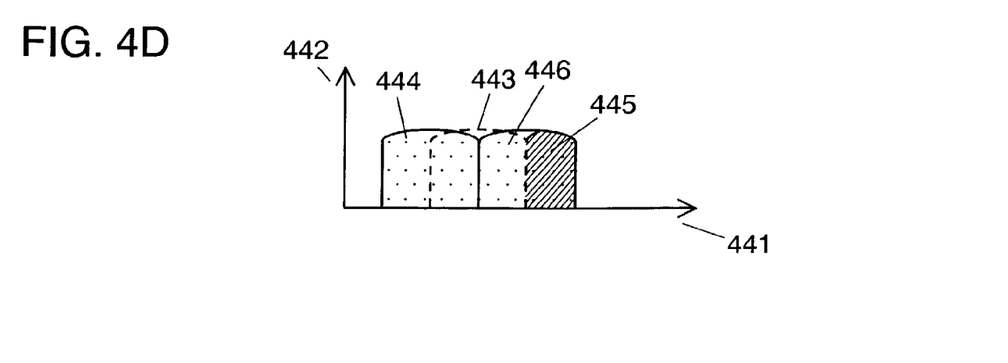
FIG. 4D shows a frequency spectrum in the block diagram shown in FIG. 4C.

FIG. 4D shows the input signal 433 and the output signal 434 of FIG. 4C, which are represented by frequency regions. Horizontal axis 441 indicates the frequency, and vertical axis 442 indicates the amplitude. Spectrum 443 is the frequency spectrum of input signal 433, and spectrum 444 and spectrum 446 are the frequency spectrum of output signal 434. Frequency shift is executed by extracting only spectrum 445, placing a band-pass filter at the rear stage in FIG. 4C.

Figure 3:
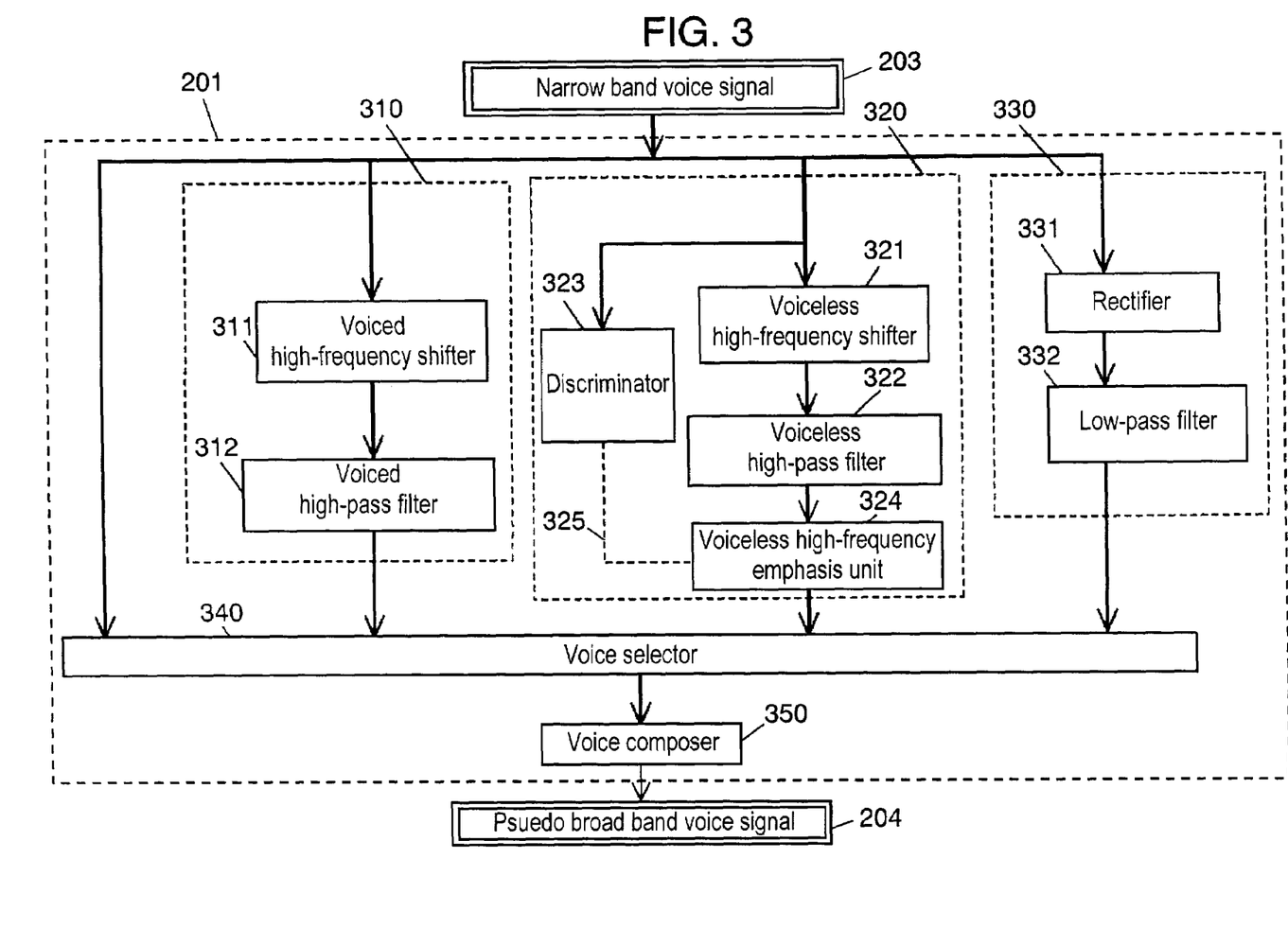
FIG. 3 is a process diagram of a voice band expanding unit of the embodiment in the telephone apparatus of the present invention.

Next, back to FIG. 3, the second voice band expander 320 comprises voiceless high-frequency shifter 321, voiceless high-pass filter 322, discriminator 323, and voiceless high-frequency emphasis unit 324.

The voiceless high-frequency shifter 321 shifts the voice signal input of narrow bandwidth only by a predetermined frequency (about 3.5 kHz) to the higher frequency side so that the upper limit frequency (3.5 kHz) of the voice signal input becomes close to the upper limit band (about 7 kHz) of voiceless sound section of the voice.

The voiceless high-pass filter 322 executes band-pass filtering of the signal shifted to the higher frequency side. That is, the voiceless high-pass filter 322 extracts the signal component of the frequency band (hereafter referred to as voiceless high frequency signal component) of which the lower limit frequency correspods to the upper limit band (about 5.5 kHz) of the voiced high frequency and the upper limit frequency correspods to the upper limit band (about 7 kHz) of the voiceless sound section. The upper limit frequency of the voiceless high frequency signal component is called a second frequency, and the frequency is about 7 kHz in the present embodiment.

The discriminator 323 analyzes an input voice signal and discriminates between a voiceless sound section including no vowel sound and a voiced sound section including vowel sound in the voice signal.

The voiceless high-frequency emphasis unit 324 executes amplitude control to make the amplitude higher in order to emphasize the voiceless sound with respect to the output signal from the voiceless high-pass filter 322 in accordance with the discrimination result of the discriminator 323.

The third voice band expander 330 comprises a rectifier 331 which generates a harmonic distortion signal by rectifying the narrow-band input voice signal, and a low-pass filter 332 which extracts the pitch-equivalent low frequency component of the voice signal out of the signal component obtained by rectification. The output of the low-pass filter 332 correspods to the output signal of the third voice band expander 330, and the output signal is called a pitch-equivalent signal component.

Also, the mode detector 223 detects the mode selected by the setter 221 such as an operation key manipulated by the user, and controls a voice selector 340 according to the result of the detedtion. The voice selector 340 selects the voice signal controlled and supplied by the mode detector 223. That is, the voice selector 340 makes the selection among the input narrow band voice signal 203, the output of voiced high-pass filter 312, the output of voiceless high-frequency emphasis unit 324, and the output of low-pass filter 332.

In the present embodiment, the user is able to select among four modes ranging from mode 1 to mode 4 shown in the following. Mode 1 is a combination of the telephone's narrow band voice signal 203 and voiced high frequency signal from the first voice band expander 310; mode 2 is a combination of the telephone's narrow band voice signal 203, voiced high frequency signal from the first voice band expander 310, and voiceless high frequency signal from the second voice band expander 320; mode 3 is a combination of the telephone's narrow band voice signal 203, voiced high frequency signal from the first voice band expander 310, and pitch-equivalent signal component from the third voice band expander 330; and mode 4 is a combination of the telephone's narrow band voice signal 203, voiced high frequency signal from the first voice band expander 310, voiceless high frequency signal from the second voice band expander 320, and pitch-equivalent signal component from the third voice band expander 330.

Voice composer 350 makes the adjustments of voiced high frequency signal from the first voice band expander 310, voiceless high frequency signal component from the second voice band expander 320, pitch-equivalent signal component from the third voice band expander 330, and telephone's narrow band signal 203 with respect to the respective delay time and sound volume ratio, and composes them to output psuedo broad-band voice signal 204.

Figure 5:
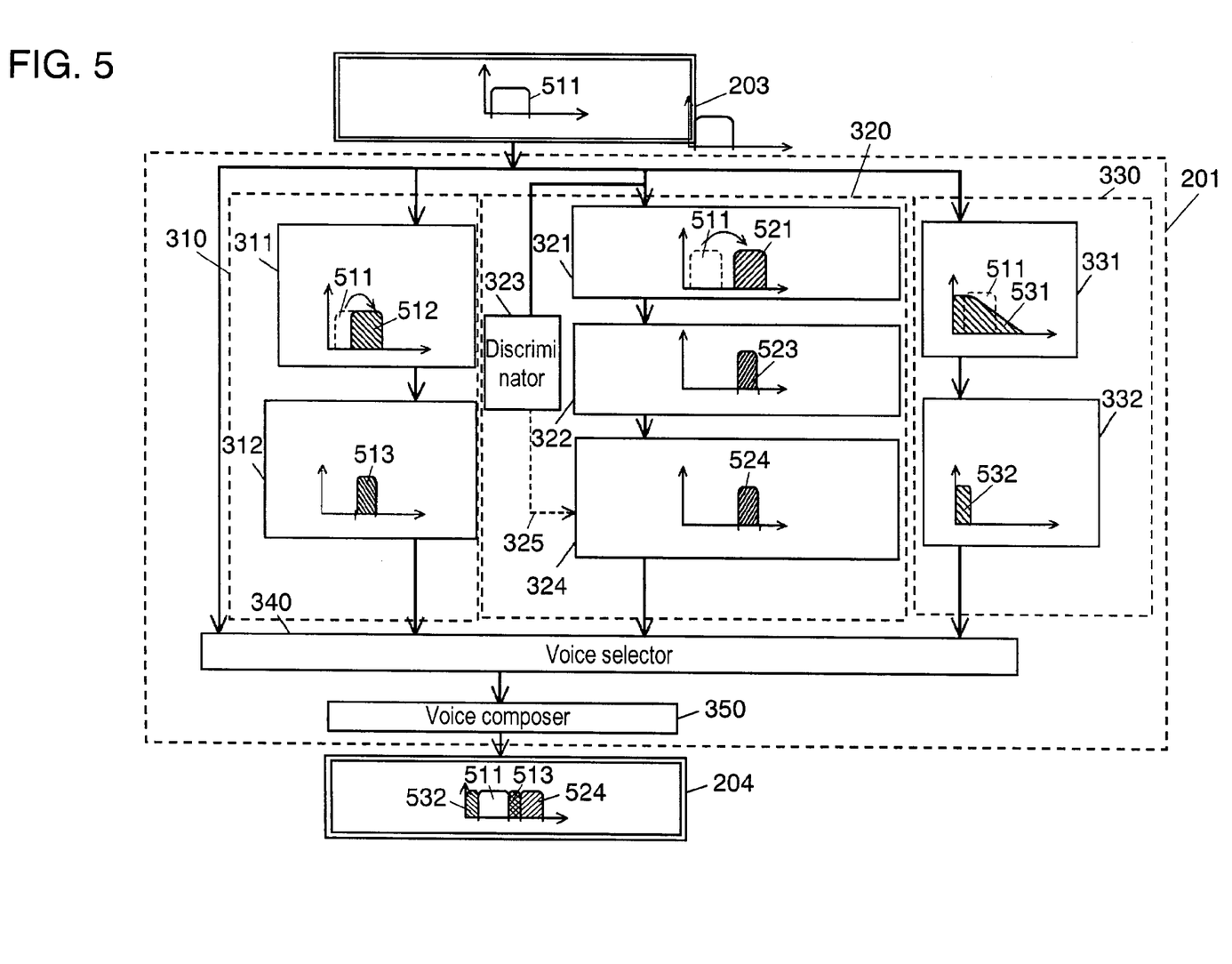
FIG. 5 shows the configuration of the voice band expanding unit and the frequency spectrum of each section of the embodiment in the telephone apparatus of the present invention.

The voice band expander unit 201 having a configuration as described above will be further described in detail by using a frequency spectrum for each section with reference to FIG. 5.

In FIG. 5, the voiced high-frequency shifter 311 in the first voice band expander 310 shifts the narrow-band frequency of voice signal to the higher frequency side so that the upper limit high frequency of the narrow-band voice signal input becomes about 5.5 kHz that is close to the upper limit band of voiced sound section of the voice. (For example, when the input is a telephone voice, it is shifted only about 2 kHz to the higher frequency side so that the signal of about 3.5 kHz at the upper limit band becomes a signal of about 5.5 kHz that is the upper limit band of voiced sound section of the voice.) The figure shown in the voiced high-frequency shifter 311 is a spectrum diagram, where the horizontal axis indicates frequency, and the vertical axis indicates amplitude. Spectrum 511 is the spectrum of narrow band voice signal input, and spectrum 512 is the spectrum of output signal from the voiced high-frequency shifter 311.

The voiced high-pass filter 312 uses a band-pass filter to extract the voiced high frequency signal component ranging in frequency bandwidth from the upper limit of the input signal band to about 5.5 kHz that is the upper limit band of voiced sound out of the signal shifted to the voiced high frequency side. (For example, when the input signal is the above-mentioned telephone voice, a signal ranging in frequency bandwidth from about 3.5 kHz to 5.5 kHz is extracted. In the present embodiment, 5.5 kHz is set as a first frequency.) The reproducibility (restorability) of the voice will be further improved by making the band-pass filter be a representative formant shape. The figure shown in the voiced high-pass filter 312 is a spectrum diagram, where the horizontal axis indicates frequency, and the vertical axis indicates amplitude. Spectrum 513 is the spectrum of output signal from the voiced high-pass filter 312.

The voiceless high-frequency shifter 321 in the second voice band expander 320 shifts the narrow-band voice signal frequency input to the higher frequency side so that the upper limit of the high frequency of the narrow-band voice signal input becomes about 7 kHz that is close to the upper limit band of the voiceless sound of the voice. (For example, when the input voice signal is a telephone voice, the input voice signal is shifted only about 3.5 kHz to the higher frequency side so that the signal of about 3.5 kHz at the upper limit band becomes a signal of about 7 kHz. In the present embodiment, 7 kHz is set as the second frequency.) The figure shown in the voiceless high-frequency shifter 321 is a spectrum diagram, where the horizontal axis indicates frequency, and the vertical axis indicates amplitude. Spectrum 511 is the spectrum of narrow band voice signal input, and spectrum 521 is the spectrum of output signal from the voiceless high-frequency shifter 321.

The voiceless high-pass filter 322 uses a band-pass filter to extract the voiceless high frequency signal component ranging in frequency bandwidth from 5.5 kHz that is the upper limit frequency of the voiced sound shifted band to about 7 kHz that is the upper limit band of voiceless sound section of the voice out of the frequency shifted signal. The figure shown in the voiceless high-pass filter 322 is a spectrum diagram, where the horizontal axis indicates frequency and the vertical axis indicates amplitude. Spectrum 523 is the spectrum of output signal from the voiceless high-pass filter 322.

The discriminator 323 analyzes the voice signal input and discriminates between a voiceless sound section including no vowel sound and a voiced sound section including vowel sound in the voice signal. That is, the discriminator 323 analyzes the features of narrow-band voice signal in every frame whose length of period ranges from scores of milliseconds to hundreds of milliseconds. For example, by using the number of zero crosses of the narrow-band voice signal included in one frame, it can be discriminated between a voiced sound section and a voiceless sound section.

In a voiced sound section, the number of zero crosses is decreased, and zero cross is liable to take place periodically. On the other hand, in a voiceless sound section, the number of zero crosses is increased, and zero cross does not take place in a periodic fashion. By utilizing this, the voiced sound section can be discriminated from the voiceless sound section. A predetermined number of zero crosses is set to be as a threshold for the discrimination, and the voiceless sound section is discriminated from the voiced sound section in accordance with the threshold.

The voiceless high-frequency emphasis unit 324 suppresses the output signal from voiceless high-pass filter 322 in the voiced sound section in accordance with the discrimination result of the discriminator 323 and does not suppress the output signal of voiceless high-pass filter 322 in the voiceless sound section, thereby making the amplitude adjustment of the voiceless high frequency signal component. The figure shown in voiceless high-frequency emphasis unit 324 is a spectrum diagram, where the horizontal axis indicates frequency and the vertical axis indicates amplitude. Spectrum 524 is the spectrum of output signal of the voiceless high-frequency emphasis unit 324.

The third voice band expander 330 comprises a rectifyier 331 and a low-pass filter 332.

The rectifyier 331 generates harmonic distortion signal by half-wave rectification or full-wave rectification of narrow-band input signals. For example, half-wave rectification in digital fashion can be realized by replacing sample values having negative sign with zero, leaving the rest of the sample values unchanged. The figure shown in rectifyier 331 is a spectrum diagram, where the horizontal axis indicates frequency and the vertical axis indicates amplitude. Spectrum 511 is the narrow-band voice signal input, and spectrum 531 is the output signal of rectifyier 331.

The low-pass filter 332 extracts the component much containing fundamental frequency component of the source voice signal out of the signal component obtained by rectification, that is, the pitch-equivalent low frequency component of the voice signal, by using a low-pass filter of 300 Hz cut-off frequency. In this way, a voice pitch-equivalent signal component is generated. Since the lower limit of the fundamental frequency is about 100 Hz, direct-current component generated due to rectification can be eliminated by using a band-pass filter ranging in pass frequency band from about 100 to 300 Hz in place of a low-pass filter. The figure shown in low-pass filter 332 is a spectrum diagram, where the horizontal axis indicates frequency and the vertical axis indicates amplitude. Spectrum 532 is the spectrum of output signal of the low-pass filter 332.

The voice composer 350 adjusts the voice signals from the first voice band expander 310, the second voice band expander 320, and the third voice band expander 330, the telephone's narrow-band signal 203, and the respective delay time and sound volume ratio, and then adds (composes) them to output psuedo broad band voice 204. The figure shown in psuedo broad band voice 204 is a spectrum diagram, where the horizontal axis indicates frequency and the vertical axis indicates amplitude. The spectrum of broad band voice signal 204 is obtained by composing the spectrum 511, spectrum 513, spectrum 524, and spectrum 532.

Figure 6:
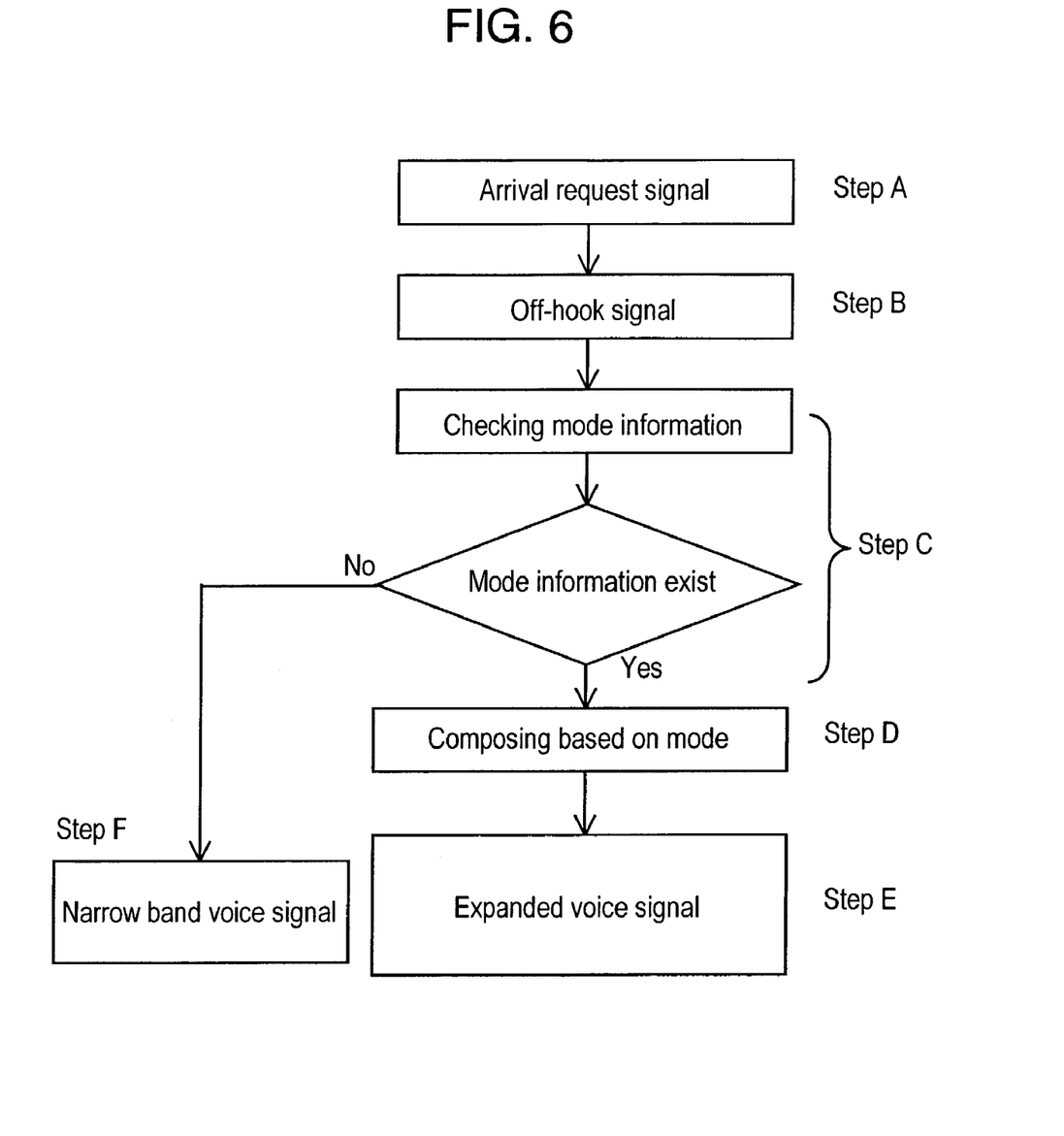
FIG. 6 is a flow chart showing the general operation of the embodiment in the telephone apparatus of the present invention.

The outline of the overall operation in the telephone apparatus of the present embodiment will be described in the following with reference to FIG. 6.

In step A, the arrival request signal detector 211 detects the arrival request signal from the transmission line 103 such as a telephone line, and generates a bell sound.

In step B, when the user picks up the receiver 107 while the bell is ringing, an off-hook signal is generated, and the off-hook signal is detected by the off-hook signal detector 212.

In step C, the mode detector 223 detects the off-hook signal and then detects whether the mode information set in the memory 222 exists or not. When the mode information exists, the narrow-band voice and the expanded voice component selected are aurally composed according to the mode in step D.

Subsequently, in step E, the broad-band voice composed as described above is output.

If judged in step C that there is no mode setting, then normal narrow-band voice is output in step F.

In this telephone apparatus, the mode can be changed by input from the setter 221 even during use of the telephone. Accordingly, when new input of a mode comes from the setter 221, the new mode information is stored in the memory 222, and further, the controller 202 changes the mode by detecting the new mode information stored in the memory 222.

The specific operation in the present embodiment will be further described in the following, explaining an example of a mode for most expanding the narrow-band voce received. That is, in the step C in FIG. 6, explained is an example in that the mode with the existence of mode setting detected is found to be the mode 4 explained earlier. The operation in step D and step E after finding the mode to be mode 4 will be described in the following.

Figure 2:
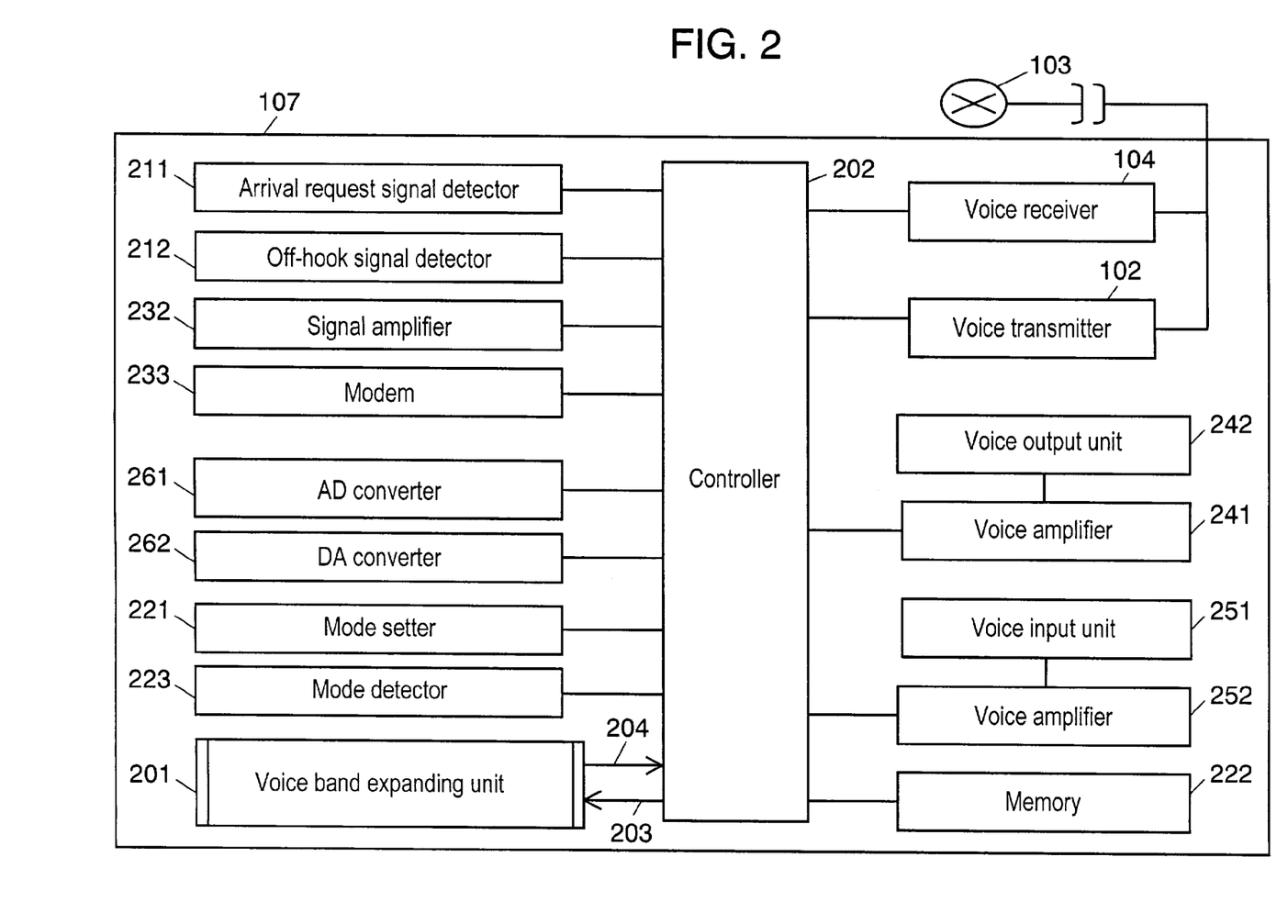
FIG. 2 is a block diagram showing the configuration of the embodiment in the telephone apparatus of the present invention.

AD converter 261 in FIG. 2 converts narrow-band analog signal such as a telephone voice input into digital signal. The sampling frequency is set to about 14 kHz or higher so as to allow a signal of about 7 kHz that is the upper limit of the band expanded in the present embodiment. In case a digital voice signal being lower than 14 kHz in sampling frequency is used, the bandwidth will be ensured by up-sampling of 14 kHz or higher.

First, the operation of the first voce band expander 310 is as follows.

Figure 7:
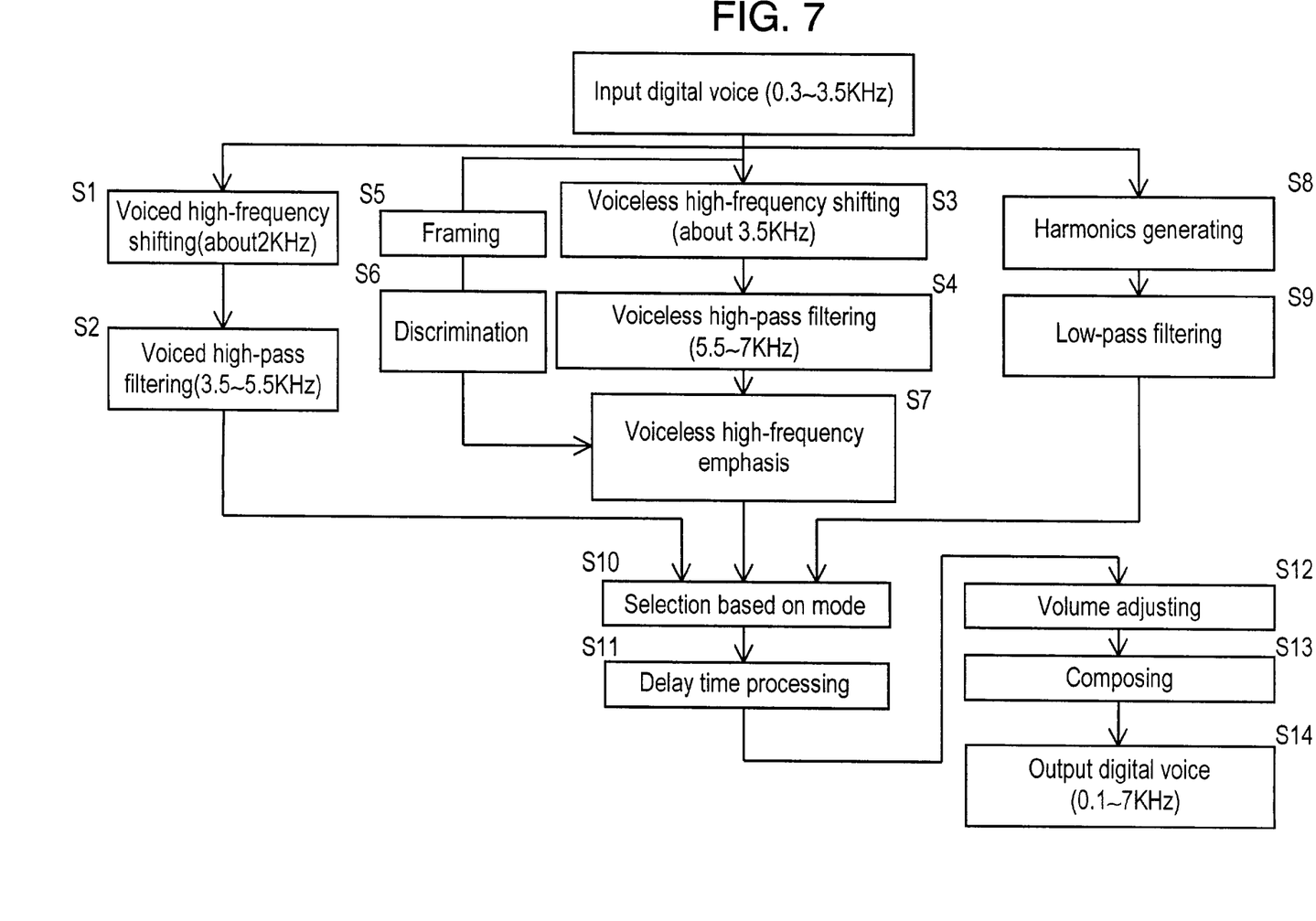
FIG. 7 is a flow chart showing the operation of the voice band expanding unit of the embodiment in the telephone apparatus in the present invention.

The operation of the first voice band expander 310 will be described in the following with reference to FIG. 2, FIG. 3, and FIG. 5 as well as FIG. 7.

In step S1, the voiced high-frequency shifter 311 shifts the frequency of narrow-band voice signal to the higher frequency side so that the upper limit of the high frequency side of the narrow-band voice signal input becomes about 5.5 kHz that is close to the upper limit band of voiced sound section. For example, when the input is a telephone voice, the signal of about 3.5 kHz at the upper limit band is shifted only about 2 kHz to the higher frequency side so that the signal frequency becomes about 5.5 kHz that is the upper limit band of voiced sound section of the voice.

In step S2, the voiced high-pass filter 312 uses a band-pass filter to extract the voiced high frequency signal component ranging in bandwidth from the upper limit of input frequency band to about 5.5 kHz that is the upper limit band of voiced sound out of the signal shifted to the voiced high frequency. For example, when the input is a telephone voice same as explained above, a signal ranging in bandwidth from about 3.5 kHz to 5.5 kHz is extracted. Here, the reproducibility of the voice is further improved by making the band-pass filter into a representative formant shape.

The operation of the second voice band expander 320 will be described in the following.

In step S3, the voiceless high-frequency shifter 321 shifts the digital voice signal frequency input of narrow bandwidth to the higher frequency side so that the upper limit of the high frequency of the narrow-band digital voice signal input becomes about 7 kHz that is close to the upper limit band of voiceless sound of the voice. For example, when the input voice signal is a telephone voice, the input voice signal is shifted by about 3.5 kHz to the higher frequency side so that the signal of about 3.5 kHz at the upper limit band becomes a signal of about 7 kHz. The shifting method is same as shifting the voiced high frequency of the first voice band expander 310.

In step S4, the voiceless high-pass filter 322 extracts the voiceless high frequency signal component ranging in bandwidth from 5.5 kHz that is the upper limit band of the voiced high frequency to about 7 kHz that is the upper limit band of voiceless sound of the voice with respect to the signal shifted about 7 kHz as described above.

In step S5, the discriminator 323 divides the digital voice signal input into frames of short-time period. The frames are scores of milliseconds in length, and they are cut out overlapping each other by one half each.

In step S6, the discriminator 323 analyzes each frame and discriminates between a voiceless sound section including no vowel sound in the voice signal and a voiced sound section including vowel sound therein on a time axis.

In step S7, the voiceless high-frequency emphasis unit 324 adjusts the amplitude of the output signal of step S4 in accordance with the result of discrimination in step S6.

The voiceless high frequency signal is suppressed in the voiced sound section and is not suppressed in the voiceless sound section, thereby making the amplitude adjustment of the voiceless high frequency. In the observation of wide-band source voice, there is a tendency that almost no signal exists in the frequency band component of the voiced sound section of the voice and that noise-like signal such as a frictional noise exists in the frequency band of only the voiceless sound section. In step S7, the tendency is reproduced by adjusting the amplitude of the signal.

Instead of dividing the sound section into two kinds of sounds such as voiced and voiceless sounds, it is also possible in step S6 to evaluate multiple stages divided between the voiced-like and voiceless-like sections and to make the respective attenuation factors a little different from each other, thereby smoothing the seam between the frames of the voice signal. Also, the natural sound of the voice will be further improved by applying a filter having a gentle attenuation characteristic which has the shape of voiced and voiceless formant to each frame of the voice signal.

The operation of the third voice band expander 330 will be described in the following.

In step S8, the rectifier 331 executes the half-wave rectification or full-wave rectification of digital voice signal in order to generate the higher harmonic component of voiced sound signal contained in the original frequency band.

In step S9, the low-pass filter 332 is a low-pass filter for the output signal of the step S8. That is, the low-pass filter extracts the low frequency component including a pitch equivalent to the fundamental frequency of the voice signal obtained by rectification, thereby generating a pitch-equivalent signal component. In this way, the low-frequency component of the voice vanished due to narrowing of the band when the signal passes through a transmission line such as a telephone line is restored in a psuedo fashion.

Here, it is possible to adjust the level of low band expanding effect by varying the amplification factor.

The frequency band is expanded in nearly same way by each voice band expander.

The operation of the voice selector 340 and voice composer 350 will be described in the following.

In step S10, the voice selector 340 selects the voices band expanded by the first voice band expander 310, the second voice band expander 320, and the third voice band expander 330 in accordance with the detected mode. Supposed here is a case that mode 4 is selected by the user, and therefore, the voice selector 340 selects the digital voice signal input and all of the outputs from the first voice band expander 310, the second voice band expander 320, and the third voice band expander 330.

In step 11, the voice composer 350 adjusts the delay time of each voice component from the voice selector 340.

In step S12, the voice composer 350 outputs the signal after adjusting the signals of individual bands to the sound volume balance of the previously set bands with reference to the frequency characteristics at the voice input side and output side of the equipment operated. It is also possible to regulate the level of the band spreading effect by varying the amplification factor.

In step S13, the voice signal of the original frequency band (300 Hz to 3.5 kHz: shown by spectrum 511 in FIG. 5), the voiced high frequency signal expanded that is the output signal of step S2 (3.5 kHz to 5 kHz: shown by spectrum 513 in FIG. 5), the voiceless high frequency signal expanded that is the output signal of step 7 (5 kHz to 7 kHz: shown by spectrum 524 in FIG. 5), and the low-frequency expanded component that is the output signal of step S9 (300 Hz or lower: shown by spectrum 532 in FIG. 5) are added by the voice composer 350, generating a psuedo wide-band signal expanded in both high and low frequency bands (voice signal band-expanded in a psuedo fashion, having frequency distribution shown in the psuedo wide-band signal 204 in FIG. 5).

In step S14, the digital signal of the composed voice is converted to analog signal, and a voice signal band-spread in a psuedo fashion is output.

In the present embodiment, the communication is made via a modem. However, it is obvious that the present invention may also be applied to analog communication such as ADSL, and digital communication such as ISDN and IP telephone as a communication system.

As described above, according to the voice band expanding unit of the present embodiment, the high frequency or high and low frequency bands may be compensated in a psuedo fashion with respect to the voice signal band-narrowed when passed through a transmission line such as a telephone line. Accordingly, the present embodiment is able to expand the band of the output voice signal while making the most of the features of the voice represented in the original voice signal bandwidth. Moreover, it is possible to execute the sound band compensation of practical sound quality by a relatively small amount of computation.

Accordingly, the present embodiment is, for example, able to substantially expand the narrow-band voice signal of a telephone currently used to a wide-band voice signal equivalent to that of AM radio.

Also, the present embodiment is able to create more natural voice signal by reinforcing the voice signal of low frequency in a psuedo fashion so as to expand both of the high and low frequency bands of the voice signal.

The improvements obtained by applying a band expanding process similar to the method of the present embodiment were subjected to public experiment using twelve Japanese ranging from 70 to 81 years old, and the results obtained are as follows.

The percentage of understanding monosyllabic voice was 65% without band expanding, which was improved to 79% by applying the present embodiment. Also, in the sound quality evaluation by a five-stage method (5-point full-mark system), the result was 3.0 without band expanding, which was improved to 3.5 by applying the present embodiment.

In the case of English or other languages containing more consonants and voiceless sounds as compared with the Japanese language, the percentage of understanding these monosyllabic voices and the evaluation result of sound quality will be more improved than in the case of the Japanese language.

Accordingly, the present embodiment is able to reduce the handicap of the aged, for instance, having a poor sense of hearing, and moreover, the configuration and method required are relatively simple. Consequently, the present embodiment can be applied to various types of voice equipment, which is also applicable in many language areas in the world, having practically significant advantages.

Many modifications and variations of the present invention are possible in the light of the above techniques. It is therefore to be understood that within the scope of the invention the invention may be practiced otherwise than as specifically described.

What is claimed is:

1. A telephone apparatus comprising:
   a first voice band expander for generating a voiced high frequency signal component, based on a voice signal received, ranging in frequency band from the upper limit frequency of said voice signal to a first frequency higher than said upper limit frequency;
   a second voice band expander for generating a voiceless high frequency signal component, based on said voice signal received, ranging in frequency band from said first frequency to a second frequency higher than said first frequency; and
   a voice composer for composing said voice signal received, said voiced high frequency signal, and said voiceless high frequency signal.

2. The telephone apparatus of claim 1, wherein said first frequency is 5.5 kHz.

3. The telephone apparatus of claim 1, wherein said second frequency is 7.0 kHz.

4. The telephone apparatus of claim 1, wherein said voice composer composes said voice signal received, said voiced high frequency signal component, and said voiceless high frequency signal component with adjusting respective differences in sound volume.

5. A telephone apparatus comprising:
   a first voice band expander for generating a voiced high frequency signal component, based on a voice signal received, ranging in frequency band from the upper limit frequency of said voice signal to a first frequency higher than said upper limit frequency;
   a second voice band expander for generating a voiceless high frequency signal component, based on said voice signal received, ranging in frequency band from said first frequency to a second frequency higher than said first frequency;
   a discriminator for discriminating between a voiceless sound section and a voiced sound section of said voice signal received;
   a voiceless high-frequency emphasis unit for increasing the amplitude of said voiceless high frequency signal component in accordance with the discrimination result of said discriminator; and
   a voice composer for composing said voice signal received, said voiced high frequency signal, and the output of said voiceless high-frequency emphasis unit.

6. The telephone apparatus of claim 5, wherein said first frequency is 5.5 kHz.

7. The telephone apparatus of claim 5, wherein said second frequency is 7.0 kHz.

8. The telephone apparatus of claim 5, wherein said voice composer composes said voice signal received, said voiced high frequency signal component, and the output of said voiceless high-frequency emphasis unit with adjusting respective differences in sound volume.

9. A telephone apparatus comprising:
   a first voice band expander for generating a voiced high frequency signal component, based on a voice signal received, ranging in frequency band from the upper limit frequency of said voice signal to a first frequency higher than said upper limit frequency;
   a second voice band expander for generating a voiceless high frequency signal component, based on said voice signal received, ranging in frequency band from said first frequency to a second frequency higher than said first frequency;
   a discriminator for discriminating between a voiceless sound section and a voiced sound section of said voice signal received;
   a voiceless high-frequency emphasis unit for increasing the amplitude of said voiceless high frequency signal component in accordance with the discrimination result of said discriminator;
   a third voice band expander for generating a pitch-equivalent signal component ranging in frequency band from the lower limit of the frequency band of said voice signal received to a third frequency lower than said lower limit frequency in accordance with the signal obtained by rectifying said voice signal received; and a voice composer for composing said voice signal received, said voiced high frequency signal component, the output of said voiceless high-frequency emphasis unit, and said pitch-equivalent signal component.

10. The telephone apparatus of claim 9, wherein said first frequency is 5.5 kHz.

11. The telephone apparatus of claim 9, wherein said second frequency is 7.0 kHz.

12. The telephone apparatus of claim 9, wherein said voice composer composes said voice signal received, said voiced high frequency signal component, the output of said voiceless high-frequency emphasis unit, and the output of said pitch-equivalent signal component with adjusting respective differences in sound volume.

13. A telephone apparatus comprising:
a first voice band expander for generating a voiced high frequency signal component, based on a voice signal received, ranging in frequency band from the upper limit frequency of said voice signal to a first frequency higher than said upper limit the frequency;
a second voice band expander for generating a voiceless high frequency signal component, based on said voice signal received, ranging in frequency band from said first frequency to a second frequency higher than said first frequency;
a third voice band expander for generating a pitch-equivalent signal component ranging in frequency band from the lower limit of the frequency band of said voice signal received to a third frequency lower than said lower limit the frequency in accordance with the signal obtained by rectifying said voice signal received; and
a voice composer for composing said voice signal received, said voiced high frequency signal component, said voiceless high frequency signal component, and said pitch-equivalent signal component.

14. The telephone apparatus of claim 13, wherein said first frequency is 5.5 kHz.

15. The telephone apparatus of claim 13, wherein said second frequency is 7.0 kHz.

16. The telephone apparatus of claim 13, wherein said voice composer composes said voice signal received, said voiced high frequency signal component, said voiceless high frequency signal component, and said pitch-equivalent signal component with adjusting respective differences in sound volume.

17. A telephone apparatus comprising:
a first voice band expander for generating a voiced high frequency signal component, based on a voice signal received, ranging in frequency band from the upper limit frequency of said voice signal to a first frequency higher than said upper limit frequency;
a second voice band expander for generating a voiceless high frequency signal component, based on said voice signal received, ranging in frequency band from said first frequency to a second frequency higher than said first frequency;
a voice selector for selecting said voice signal, and at least said voiced high frequency signal component and said voiceless high frequency signal component; and
a voice composer for composing individual voice signals selected by said voice selector.

18. The telephone apparatus of claim 17, wherein said first frequency is 5.5 kHz.

19. The telephone apparatus of claim 17, wherein said second frequency is 7.0 kHz.

20. The telephone apparatus of claim 17, wherein said voice composer executes voice composition with adjusting the respective differences in sound volume of individual voice signals selected by said voice selector.

21. A telephone apparatus comprising:
a first voice band expander for generating a voiced high frequency signal component, based on a voice signal received, ranging in frequency band from the upper limit frequency of said voice signal to a first frequency higher than said upper limit frequency;
a second voice band expander for generating a voiceless high frequency signal component, based on said voice signal received, ranging in frequency band from said first frequency to a second frequency higher than said first frequency;
a discriminator for discriminating between a voiceless sound section and a voiced sound section of said voice signal received;
a voiceless high-frequency emphasis unit for increasing the amplitude of said voiceless high frequency signal component in accordance with the discrimination result of said discriminator;
a voice selector for selecting said voice signal received, and at least either of said voiced high frequency signal component and the output of said voiceless high-frequency emphasis unit; and
a voice composer for composing individual voice signals selected by said voice selector.

22. The telephone apparatus of claim 21, wherein said first frequency is 5.5 kHz.

23. The telephone apparatus of claim 21, wherein said second frequency is 7.0 kHz.

24. The telephone apparatus of claim 21, wherein said voice composer executes voice composition with adjusting the respective differences in sound volume of individual voice signals selected by said voice selector.

25. A telephone apparatus comprising:
a first voice band expander for generating a voiced high frequency signal component, based on a voice signal received, ranging in frequency band from the upper limit frequency of said voice signal to a first frequency higher than said upper limit frequency;
a second voice band expander for generating a voiceless high frequency signal component, based on said voice signal received, ranging in frequency band from said first frequency to a second frequency higher than said first frequency;
a third voice band expander for generating a pitch-equivalent signal component ranging in frequency band from the lower limit of the frequency band of said voice signal received to a third frequency lower than said lower limit frequency in accordance with the signal obtained by rectifying said voice signal received;
a voice selector for selecting said voice signal received, and at least one of said voiced high frequency signal component, said voiceless high frequency signal component, and said pitch-equivalent signal component; and
a voice composer for composing individual voice signals selected by said voice selector.

26. The telephone apparatus of claim 25, wherein said first frequency is 5.5 kHz.

27. The telephone apparatus of claim 25, wherein said second frequency is 7.0 kHz.

28. The telephone apparatus of claim 25, wherein said voice composer executes voice composition with adjusting the respective differences in sound volume of individual voice signals selected by said voice selector.

29. A telephone apparatus comprising:
- a first voice band expander for generating a voiced high frequency signal component, based on a voice signal received, ranging in frequency band from the upper limit frequency of said voice signal to a first frequency higher than said upper limit frequency;
- a second voice band expander for generating a voiceless high frequency signal component, based on said voice signal received, ranging in frequency band from said first frequency to a second frequency higher than said first frequency;
- a discriminator for discriminating between a voiceless sound section and a voiced sound section of the voice signal received;
- a voiceless high-frequency emphasis unit for increasing the amplitude of said voiceless high frequency signal component in accordance with the discrimination result of said discriminator;
- a third voice band expander for generating a pitch-equivalent signal component ranging in frequency band from the lower limit of the frequency band of said voice signal received to a third frequency lower than said lower limit frequency in accordance with the signal obtained by rectifying said voice signal received;
- a voice selector for selecting said voice signal received, and at least one of said voiced high frequency signal component, the output of said voiceless high-frequency emphasis unit, and said pitch-equivalent signal component; and
- a voice composer for composing individual voice signals selected by said voice selector.

30. The telephone apparatus of claim 29, wherein said first frequency is 5.5 kHz.

31. The telephone apparatus of claim 29, wherein said second frequency is 7.0 kHz.

32. The telephone apparatus of claim 29, wherein said voice composer executes voice composition with adjusting the respective differences in sound volume of individual voice signals selected by said voice selector.

33. A telephone apparatus comprising:
- a receiver for receiving a voice signal;
- a first voice band expander for generating a voiced high frequency signal component, based on the voice signal received by said receiver, ranging in frequency band from the upper limit frequency of said voice signal to a first frequency higher than said upper limit frequency;
- a second voice band expander for generating a voiceless high frequency signal component, based on said voice signal received, ranging in frequency band from said first frequency to a second frequency higher than said first frequency; and
- a voice composer for composing said voice signal received, said voiced high frequency signal component, and said voiceless high frequency signal component.

34. The telephone apparatus of claim 33, wherein said first frequency is 5.5 kHz.

35. The telephone apparatus of claim 33, wherein said second frequency is 7.0 kHz.

36. The telephone apparatus of claim 33, wherein said voice composer executes voice composition with adjusting the respective differences in sound volume of said voice signal received, said voiced high frequency signal component, and said voiceless high frequency signal component.

37. A telephone apparatus comprising:
- a receiver for receiving a voice signal;
- a first voice band expander for generating a voiced high frequency signal component, based on the voice signal received by said receiver, ranging in frequency band from the upper limit frequency of said voice signal to a first frequency higher than said upper limit frequency;
- a second voice band expander for generating a voiceless high frequency signal component, based on said voice signal received, ranging in frequency band from said first frequency to a second frequency higher than said first frequency;
- a mode setter for setting a mode of adding said voiced high frequency signal component to said voice signal received, and a mode of adding said voiced high frequency signal component and said voiceless high frequency signal component to said voice signal received;
- a memory for storing said mode;
- an off-hook generator for generating an off-hook signal;
- an off-hook signal detector for detecting said off-hook signal;
- a voice composer for executing specified voice composition in accordance with the mode stored in said memory when said off-hook signal is detected; and
- a voice output unit for outputting the voice signal composed by said voice composer as a voice.

38. The telephone apparatus of claim 37, wherein said first frequency is 5.5 kHz.

39. The telephone apparatus of claim 37, wherein said second frequency is 7.0 kHz.

40. The telephone apparatus of claim 37, wherein said voice composer executes voice composition with adjusting the respective differences in sound volume of signals input into said voice composer.

41. A telephone apparatus comprising:
- a receiving means for receiving a voice signal;
- a first voice band expanding means for generating a voiced high frequency signal component, based on the voice signal received by said receiving means, ranging in frequency band from the upper limit frequency of said voice signal to a first frequency higher than said upper limit frequency; a second voice band expanding means for generating a voiceless high frequency signal component, based on said voice signal received, ranging in frequency band from said first frequency to a second frequency higher than said first frequency;
- a mode setting means for setting a mode of adding said voiced high frequency signal component to said voice signal received, and a mode of adding said voiced high frequency signal component and said voiceless high frequency signal component to said voice signal received; a memory for storing said mode;
- an off-hook generating means for generating an off-hook signal;
- an off-hook signal detecting means for detecting said off-hook signal;
- a voice composing means for executing specified voice composition in accordance with the mode stored in said memory when said off-hook signal is detected; and
- a voice output unit means for outputting the voice signal composed by said voice composer as a voice.

42. The telephone apparatus of claim 41, wherein said first frequency is 5.5 kHz.

43. The telephone apparatus of claim 41, wherein said second frequency is 7.0 kHz.

44. The telephone apparatus of claim 41, wherein said voice composing means executes voice composition with adjusting the respective differences in sound volume of signals input into said voice composing means.

45. A communication apparatus comprising:
a first bandwidth expander configured to receive a first signal component, said first signal component having an operating range up to a predetermined first upper limit in frequency, and shift said first signal component beyond said first upper limit in frequency to generate a second signal component with a second upper limit higher than said first upper limit; and
a composer configured to compose said first signal component and one or more additional signal components.

46. The communication apparatus according to claim 45, further comprising:
a second bandwidth expander configured to receive said first signal component and shift said first signal component beyond said second upper limit in frequency to generate a third signal component,
wherein the composer composes said first signal component, said second signal component, and said third signal component.

47. The communication apparatus according to claim 45, further comprising:
a first filter configured to generate a fourth signal component within a predetermined first frequency range from said second signal component,
wherein said composer composes said first signal component and said fourth signal component.

48. The communication apparatus according to claim 46, further comprising:
a first filter configured to generate a fourth signal component within a predetermined first frequency range from said second signal component; and
a second filter configured to generate a fifth signal component within a predetermined second frequency range from said third signal component,
wherein said composer composes said first signal component, said fourth signal component, and said fifth signal component.

49. The communication apparatus according to claim 48 wherein the first signal component has an operating range from a predetermined first lower limit in frequency to the predetermined first upper limit in frequency, the apparatus further comprising:
a third bandwidth expander configured to receive said first signal component, and to shift said first signal component below said first lower limit in frequency to generate a sixth signal component;
a third filter configured to generate a seventh signal component within a predetermined third frequency range which is at least lower than the lower limit, from said sixth signal component,
wherein said composer composes said first signal component, said fourth signal component, said fifth signal component, and said seventh signal component.

50. A communication apparatus according to claim 45, further comprising:
a delay circuit configured to delay said first signal component.

* * * * *